United States Patent
Roeder et al.

(10) Patent No.: US 12,035,720 B2
(45) Date of Patent: Jul. 16, 2024

(54) ANTIMICROBIAL SURFACE SYSTEMS

(71) Applicants: Jeffrey F. Roeder, Brookfield, CT (US); Melissa A. Petruska, Newtown, CT (US); Trevor E. James, Plantsville, CT (US); Thomas J. Spoonmore, Norwalk, CT (US); Peter C. Van Buskirk, Newtown, CT (US)

(72) Inventors: Jeffrey F. Roeder, Brookfield, CT (US); Melissa A. Petruska, Newtown, CT (US); Trevor E. James, Plantsville, CT (US); Thomas J. Spoonmore, Norwalk, CT (US); Peter C. Van Buskirk, Newtown, CT (US)

(73) Assignee: Sonata Scientific LLC, Danbury, CT (US)

( * ) Notice: Subject to any disclaimer, the term of this patent is extended or adjusted under 35 U.S.C. 154(b) by 95 days.

(21) Appl. No.: 17/343,723

(22) Filed: Jun. 9, 2021

(65) Prior Publication Data

US 2021/0337804 A1   Nov. 4, 2021

Related U.S. Application Data

(63) Continuation-in-part of application No. 16/987,386, filed on Aug. 6, 2020, now Pat. No. 11,857,924, which is a continuation-in-part of application No. 16/680,495, filed on Nov. 12, 2019, now Pat. No. 11,241,671, which is a continuation-in-part of application No. 16/212,663, filed on Dec. 6, 2018, now Pat. No. 11,052,385, and a continuation-in-part of application No. 16/147,536, filed on Sep. 28, 2018, now abandoned.

(60) Provisional application No. 63/036,651, filed on Jun. 9, 2020, provisional application No. 62/883,286, filed on Aug. 6, 2019, provisional application No. 62/760,428, filed on Nov. 13, 2018, provisional application No. 62/595,261, filed on Dec. 6, 2017, provisional application No. 62/564,408, filed on Sep. 28, 2017.

(51) Int. Cl.
*A01N 59/20*  (2006.01)
*A01N 25/10*  (2006.01)
*A01N 59/06*  (2006.01)

(52) U.S. Cl.
CPC ............. *A01N 59/20* (2013.01); *A01N 25/10* (2013.01); *A01N 59/06* (2013.01)

(58) Field of Classification Search
None
See application file for complete search history.

(56) References Cited

U.S. PATENT DOCUMENTS

| | | | |
|---|---|---|---|
| 7,354,596 B1 * | 4/2008 | Banovetz | A01N 25/10 424/407 |
| 2011/0027138 A1 * | 2/2011 | Hugener-Campbell | B01J 35/023 502/232 |
| 2012/0100039 A1 * | 4/2012 | Appeaning | A61L 2/088 422/186.01 |
| 2013/0171228 A1 * | 7/2013 | Morris | A61L 31/088 556/110 |
| 2015/0245618 A9 * | 9/2015 | Agrawal | A01N 25/26 424/405 |

* cited by examiner

*Primary Examiner* — Robert T Butcher
(74) *Attorney, Agent, or Firm* — Gregory Stauf

(57) ABSTRACT

Polymer coatings and surfaces are disclosed with antimicrobial properties. The antimicrobial action is provided by high surface area materials contained within the coating or surface. The high surface area materials may contain photocatalysts that create reactive oxygen species upon exposure to visible light or transition metals that create reactive oxygen species upon exposure to hydrogen peroxide. The high surface area materials may also sorb disinfecting liquids and desorb them over time to provide disinfection.

22 Claims, 10 Drawing Sheets

ANTIMICROBIAL SURFACE SYSTEMS

CROSS REFERENCE TO RELATED APPLICATIONS

Photocatalytic Fluid Purification Systems, U.S. Provisional Patent Application 62/564,408, filed Sep. 28, 2017, Photocatalytic Surface Systems, U.S. Provisional Patent Application 62/595,261, filed Dec. 6, 2017, Photocatalytic Fluid Purification Systems, U.S. patent application Ser. No. 16/147,536, filed Sep. 28, 2018, Monolithic Composite Photocatalysts, U.S. Provisional Patent Application 62/760,428, filed Nov. 13, 2018, Photocatalytic Surface Systems, U.S. patent application Ser. No. 16/212,663 filed Dec. 6, 2018, Photocatalytic Fluidized Bed Reactor Systems, U.S. Provisional Patent Application 62/883,286, filed Aug. 6, 2019, Monolithic Composite Photocatalysts U.S. patent application Ser. No. 16/680,495, filed Nov. 12, 2019, Antimicrobial Surface Systems, U.S. Provisional Patent Application 63/036,651, filed Jun. 9, 2020, and Photocatalytic Fluidized Bed Reactor Systems, U.S. patent application Ser. No. 16/987,386, filed Aug. 6, 2020.

GOVERNMENT RIGHTS

This work was performed under the following grants/contracts: Centers for Disease Control Grant #R43CK000567, National Science Foundation Grant #2030025, and Environmental Protection Agency Contract #68HERC21C0023. The government retains certain rights in this invention.

BACKGROUND OF THE INVENTION

References

Wang C, Liu H, Sun, Z "Heterogeneous Photo-Fenton Reaction Catalyzed by Nanosized Iron Oxides for Water Treatment" Int J Photoenergy 2012, 801694.

Munnik, P., de Jongh, P. E., & de Jong, K. P. (2015). Recent developments in the synthesis of supported catalysts. Chem Rev, 115(14), 6687-6718.

Yabuta, K., Futamura, H., Kawasaki, K., & Sugiyama, H. (2020). Impact of H2O2 Sorption by Polymers on the Duration of Aeration in Pharmaceutical Decontamination. Journal of Pharmaceutical Sciences, 109(9), 2767-2773.

The world is faced with increasing threats from harmful microbes, including bacteria, viruses, spores and bacteria comprised biofilms. Healthcare Associated Infections (HAI) are a major problem that threatens life and increases costs of healthcare. The CDC estimates that in the U.S. there are 1.7 million hospital-associated infections annually, contributing to 99,000 deaths. One primary transmission mode for these infections involves contact with contaminated surfaces, where bacteria and viruses can reside for days or even weeks on touch surfaces near the patient. MRSA, C. *Difficile*, MDRA and *Staphylococcus* are particularly dangerous and stubborn contagions that may reside on surfaces close to a patient. Many types are difficult to attack with antibiotics, and antibiotic resistance is spreading to Gram-negative bacteria that can infect people outside the hospital.

Viruses also present a significant threat to humans. The SARS-CoV-2 outbreak serves as an example of a new pathogen that spreads rapidly and for which there is no current solution to minimize propagation. Viable SARS-CoV-2 virions have been found to survive for up to 72 hours on metal and plastic surfaces. Hand to mouth transmission from contaminated surfaces often occurs for viruses. Therefore, it is of great need to provide surfaces that self-disinfect or have lasting disinfecting properties.

Outside the healthcare world, there are a similar and increasing range of opportunistic mass-infections as evidenced by recent Norovirus and Covid-19 outbreaks on cruise ships. These outbreaks may be spread by viruses, bacteria and spores that propagate both airborne and from surfaces to surface.

Many standard disinfecting regimens (typically liquids comprised of bleach or hydrogen peroxide) may leave a residual contagion on a surface, which is known as "Bioburden". Bioburden is comprised of biofilm or planktonic species residing at a surface that is nominally 'clean'. Its presence may be due to failure of hospital staff to follow standard procedures, species with exceptional physical, chemical and biological robustness, or a combination of those. Even when cleaners work well, they are only effective when applied, and the time between cleanings allows the re-accumulation of bacteria or virions. There are several disinfectant treatments that are receiving wide attention as ways to augment liquid treatments. UV-C radiation, ozone and disinfectant vapors or mists can be effective against pathogens, but are highly hazardous and are only viable when a hospital room has been vacated.

Antimicrobial, or 'self sterilizing' surfaces are highly desirable to complement standard cleaning. They act continuously, and ideally they should have a high killing efficiency for a broad range of bacteria, viruses and spores, and be non-toxic to humans. Silver (Silver metal) and copper (Cu metal) containing surfaces are the most widely investigated, but these have shortcomings including toxicity, cost and questions about long term efficacy, due to adaptation of bacteria.

Titanium dioxide is the archetypal photocatalyst, due to its highly oxidizing properties when irradiated by UV light, physical robustness, insolubility in water, low cost, low toxicity and other attributes. Photocatalysis using titanium dioxide (titania, $TiO_2$) has received huge interest for purifying gases and fluids, in particular air and aqueous fluids, via oxidizing chemical reactions at a surface, via creation of electron-hole pairs.

A wide variety of titania-based materials, doping schemes, and physical configurations have been proposed to enhance and utilize photocatalysis at $TiO_2$ surfaces, although so far there has not been widespread adoption of the technology for purification of air, fluids or surfaces.

Photocatalysis is typically achieved by a low or medium pressure UV lamp, or in some cases a Xenon lamp, irradiating the front surface of a ceramic- or powder-based titania surface, i.e., from the direction of the medium that is targeted to be purified. UVC LEDs (200-280 nm) have also been employed, although these devices typically have low efficiency, short product lifetimes and are unreliable. Photocatalysis utilizing titanium dioxide is typically excited by illumination in the UVC or UVA spectral region (320-400 nm), which is hazardous to humans, more technologically complicated and more expensive than visible light-based illumination sources.

The chemical activation at the surface of a photocatalytic material originates with the formation of electron-hole pairs that arise from optical absorption of photons with sufficient energy. Activation at the surface typically has a finite lifetime that is limited by recombination of electron-hole pairs. Mitigation of these effects has been investigated primarily via chemical modification of the titania particles, although there has been no consensus in technical approach for manufacturing practical photocatalyst materials and systems.

The activated surface provides disinfection by means of reactive oxygen species (ROS) that form by the combination of atmospheric oxygen and moisture with the photocatalytically generated electrons or holes at the surface of the material. ROS are broadly antimicrobial, killing bacteria and spores and disabling viruses by direct cell damage.

The photocatalytic materials of the present invention, such as those described above, may be formed in a variety of configurations also identified in the present invention, thereby enabling a range of photocatalytic antimicrobial surfaces and devices.

The photocatalytic materials and illumination schemes of the subject invention may be incorporated in a wide range of devices in order to effect or enhance antimicrobial characteristics of surfaces. These materials may be directly applied to solid surfaces of interest, or applied to flexible polymeric materials that are subsequently applied to surfaces or formed into those products directly.

Although photocatalytic materials provide the means to create self-disinfecting surfaces, they are active only under illumination. After illumination is removed, the electron-hole pairs decay and the production of ROS ceases. Therefore, it is valuable to provide a means of extending the disinfection properties of the surface for longer times, and under low light, or in the absence of illumination.

Metals have been used to provide antimicrobial properties in the absence of illumination. Silver and copper have shown efficacy in providing bactericidal activity. However, these metals are not sufficiently effective against all viruses or spore based pathogens. It is therefore of interest to provide additional means of self-disinfection of surfaces that extend beyond illumination and have efficacy in poorly illuminated conditions or in dark conditions.

Those antimicrobial products that may incorporate the subject inventions include but are not limited to: doorknobs, pens, smartphone screens, computer screens and keyboards, escalator rails, elevator buttons, countertops, hospital 'high touch surfaces' such as bed hand rails, medical instrumentation, medical instruments, etc.

It is evident that these materials, when incorporated on consumer, commercial and medical products, will be exposed to considerable abrasion, mechanical impact and chemical agents used to clean and sanitize these products daily. Therefore, abrasion resistance is an important property of any surface or applied coating used in practical applications.

The subject invention may be embodied in the following examples that are by no means restrictive but intended to illustrate the invention. It will be clear that the described invention is well adapted to achieve the purposes described above, as well as those inherent within. The citation of any publication is for its disclosure prior to the filing date and should not be construed as an admission that the present invention is not entitled to antedate such publication by virtue of prior invention. Numerous other changes may be made which will readily suggest themselves to those skilled in the art and which are encompassed both in the spirit of the disclosure above and the appended claims.

SUMMARY OF THE INVENTION

In one aspect, the present invention relates to novel materials that generate reactive oxygen species (ROS) on surfaces of interest under poorly illuminated or non-illuminated (dark) conditions, resulting in bactericidal, virucidal or sporicidal properties. (Mode 1). Examples of ROS include, but are not limited to hydroxyl radical ($\cdot$OH), peroxyl radical ($\cdot$OOH), superoxide ($O_2\cdot^-$), singlet oxygen ($^1O_2$), and carbonate radical ($CO_3\cdot^-$).

In another aspect, the invention relates to novel photocatalytic materials that may be activated using visible light, that are incorporated into a surface to provide ROS under visible illumination, especially 400-460 nm wavelengths, resulting in bactericidal, virucidal or sporicidal properties. (Mode 2)

In another aspect, the invention relates to combining Mode 1 and Mode 2 to achieve both photocatalytic and low or non-illumination generation of ROS, resulting in bactericidal, virucidal or sporicidal properties under a wide range of illumination levels. (Mode 3)

In yet another aspect, the invention relates to the surface matrix materials that incorporate the subject materials with the target properties.

In still another aspect, it also relates to fluid cleaning or disinfecting formulations for the subject high durability surfaces that provide a specific chemistry for Mode 1 and Mode 3 ROS generation and that complement the photocatalytically induced disinfecting activity of the surface in Mode 2 and Mode 3.

In another aspect the invention relates to methods to form the antimicrobial surface systems, including extrusion, spray coating, and 3-d additive manufacturing.

In another aspect the invention relates to methods to store and release disinfecting agents from the surface. (Mode 4)

DETAILED DESCRIPTION OF THE INVENTION AND PREFERRED EMBODIMENTS THEREOF

Figure 1:
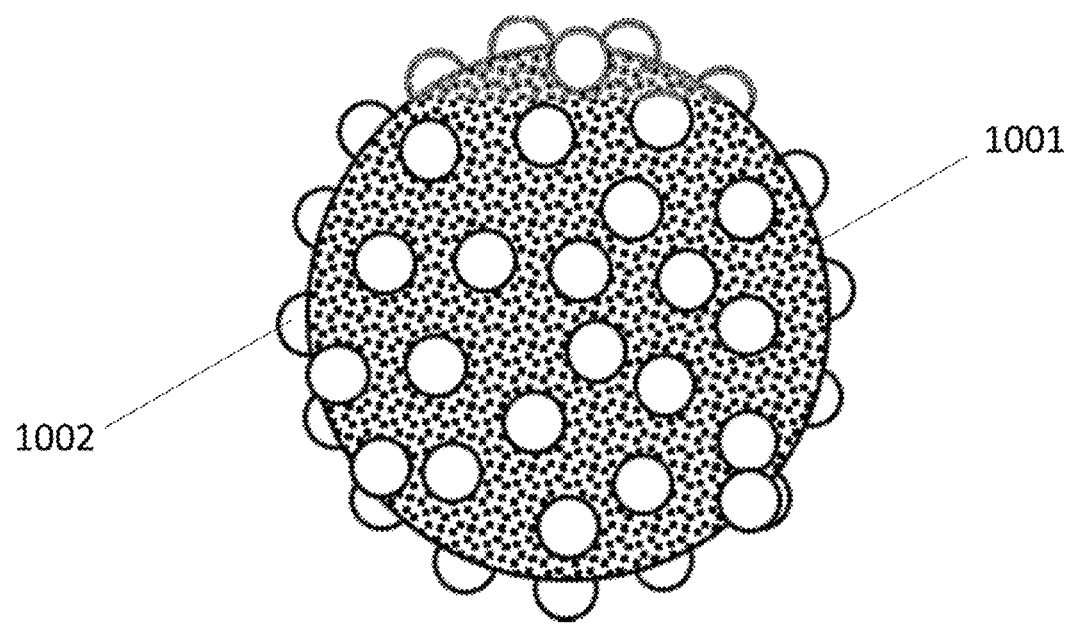
FIG. 1 shows a high surface area (HSA) support that has metal oxide nanoparticles disposed on the surface.

In one aspect, the present invention relates to novel materials that generate reactive oxygen species (ROS) on surfaces of interest under poorly illuminated or non-illuminated (dark) conditions. In order to provide ROS generation, a disinfecting-liquid-initiated Fenton reaction scheme is used to obtain biocidal activity that extends for longer periods than on standard surfaces under low-light intensity. This Fenton reaction scheme provides virucidal, bactericidal and sporicidal activity that extends between cleaning events, again, where the cleaning process replenishes the coating system. The key attributes of the subject inventions comprise:

a. A heterogenous surface composition that incorporates high surface area (HSA) materials with pore volume that may serve as a reservoir for hydrogen peroxide, cleaning or disinfectant solutions containing hydrogen peroxide, or other disinfectants.

b. A heterogenous surface that provides Cu or Fe moieties or other Fenton or Fenton like catalysts that are spatially segregated and or compositionally distinct from the hydrogen peroxide storing pore volume c. Providing a hydrogen-peroxide-based disinfecting liquid to the heterogeneous surface of a.-b., to enable Fenton reactions to generate ROS over extended time periods.

d. A heterogenous surface composition that also incorporates a photocatalyst, which complements a.-c. as a source to generate ROS e. A heterogenous surface composition that also incorporates a photocatalyst that provides the pore volume described in a, and which complements a.-c. as a source to generate ROS As used herein and in the appended claims, high-surface-area support (HSA) refers to a metal oxide or mixed metal oxide porous material 0.5-150 microns in the longest dimension, surface area 50-600 m$^2$/g, mesopore size 2-50 nm, and pore volume 0.2-1.5 cc/g. Examples of HSA compositions include alumina, zirconia, titania, silica-alumina, alumina-silicates, silica, and zeolites. These HSAs may be referred to as inorganic HSAs or HSA materials.

As used herein and in the appended claims, N$_2$ BET surface area or BET surface area is the value of surface area determined from BET (Brunauer Emmett Teller) analysis of N$_2$ isotherms collected at 77 K.

As used herein and in the appended claims, core-shell structures are metal oxide particles on the external surface (shell) of an HSA core. The mass loading of is in the range 0.1-30%. The internal structure of the HSA remains substantially free of the metal oxide nanoparticles. Substantially free means <10% on average across the interior volume of the HSA support, preferably <1%, more preferably <0.1% and most preferably 0.01%. The center region, defined as the center 75% of the volume should have <0.1% metal.

As used herein and in the appended claims, compositionally distinct means having a composition that is different in the internal region or core of an HSA support and the outer region or shell of an HSA support as described in the preceding paragraph.

As used herein and in the appended claims, disinfecting liquids are

As used herein and in the appended claims, sorption (to sorb) is the process by which disinfecting liquids and their components can become part of the surface system. Sorption can occur by adsorption (e.g., chemisorption, physisorption, etc.), absorption, and other processes or combinations of process by which the components of disinfecting liquids can adhere to the surface system.

As used herein and in the appended claims, desorption (to desorb) is the process by which the components of disinfecting liquids are released from the surface system. As used herein and in the appended claims, high-surface area polymers are The Fenton reaction relies on a reversable oxidation/reduction reaction that generates oxidative radicals from peroxide. The most common Fenton reaction involves iron. Copper will also cause the formation of hydroxyl (HO*) and hydroperoxyl (HOO*) free radicals from hydrogen peroxide through a Fenton reaction. For the purposes of illustration, Cu is described here, although the concept applies equally well to iron. The first step is peroxide oxidation of cuprous ion (Cu+) to cupric (Cu2+) with the formation of a hydroxyl free radical and hydroxide ion. The second step regenerates the cuprous ion with the formation of a hydroperoxyl free radical and a proton. The net reaction is the formation of two different free radical species and water from two hydrogen peroxide molecules:

$$Cu^+ + H_2O_2 \rightarrow Cu^{2+} + HO^* + OH^-$$

$$Cu^{2+} + H_2O_2 \rightarrow Cu^+ + HOO^* + H^+$$

$$\text{net}: 2H_2O_2 \rightarrow HO^* + HOO^* + H_2O$$

Other polyvalent metals have the ability to produce similar Fenton-like reactions. These include Ni, Co, Ag, Mn, and Ce. These metals and oxides thereof may be used advantageously in the present invention as alternatives to Fe and Cu metals and their oxides.

Overall, the free radical (ROS) production is increased compared to the unassisted decomposition of hydrogen peroxide. The free radicals oxidize and break down organic compounds, and this approach has been used commercially to decontaminate wastewater with organic pollutants with low (mmol) peroxide concentrations. The free radicals are also potent antivirals. Although photo Fenton reactions have been proposed for wastewater treatment, and may in fact operate in our case under illuminated conditions, this mode utilizes the basic Fenton reaction, which can vigorously create oxidizing radicals in the absence of light to disable virions, bacteria, or spores. Photo activation may be optionally used to enhance the kinetics of the reactions. A general difficulty with Fenton reactions is that they occur over a narrow acidic pH range (2-4) for bulk metals. The use of metal nanoparticles greatly expands the pH range for the reaction (2-8). It is important to immobilize the nanoparticles from a practical and environmental perspective.

A key concept is to create reservoirs for peroxide that are in proximity to, but separated from, the metal (in the form of an oxide). In clinical practice, the reservoir is refilled each time a liquid disinfecting procedure is performed. HSA materials, including alumina, zirconia, titania, silica-alumina, aluminasilicate, silica, and zeolites have the ability to sorb and desorb water. This phenomenon forms the basis for the sorption and desorption of aqueous peroxide or disinfecting liquids. Without wishing to be bound by theory, the driving force for sorption and desorption is concentration gradient, e.g., water concentration in the reservoir vs. ambient humidity. Similar schemes have been proposed with aerogels, but those materials are fragile. A more mechanically robust material, such as an HSA support, is preferred for its ability to impart wear resistance to a surface or coating into which it is incorporated.

Mechanically robust, high-surface-area polymers may also be used to impart wear resistance to a surface or coating in which it is incorporated and provide a reservoir for the components of disinfecting liquids, including peroxide species. High-surface-area polymers suitable for providing wear resistance and reservoirs include polyethylene (PE), polypropylene, polyvinyl chloride (PVC), chlorosulfonated polyethylene (CSM), polyoxymethylene (POM). This class of HSAs may be referred to as organic HSAs. The reservoir properties and the mechanical properties of the polymers may be controlled by cross-linking or intentionally introduced porosity. For example, a particular polymer may have different degrees of cross-linking. Higher degrees of cross-linking will increase mechanical strength. Cross-linking may be induced by condensation reactions that are thermally driven or via UV (ultraviolet) light curing. Cross-linking agents include bifunctional monochlorodimethylether (MCDE), tetrachloromethane (CCl4), dichloroxylene (DCX), 4,4'-bis(chloromethyl)biphenyl (BCMBP), p,p'-bis-chloromethyl-1,4-diphenylbutane (DPB), divinylbenzene (DVB), and trifunctional tris-(chloromethyl)-mesitylene (TCMM). The porosity of the polymer network can be varied by the cross-linking agent used. For example, a cross-linking agent with a greater chain length will result in a material with increased porosity and decreased surface area. The porosity of these materials ranges from microporous to macroporous with a surface area on the order of 150-4000 $m^2/g$.

Figure 2:
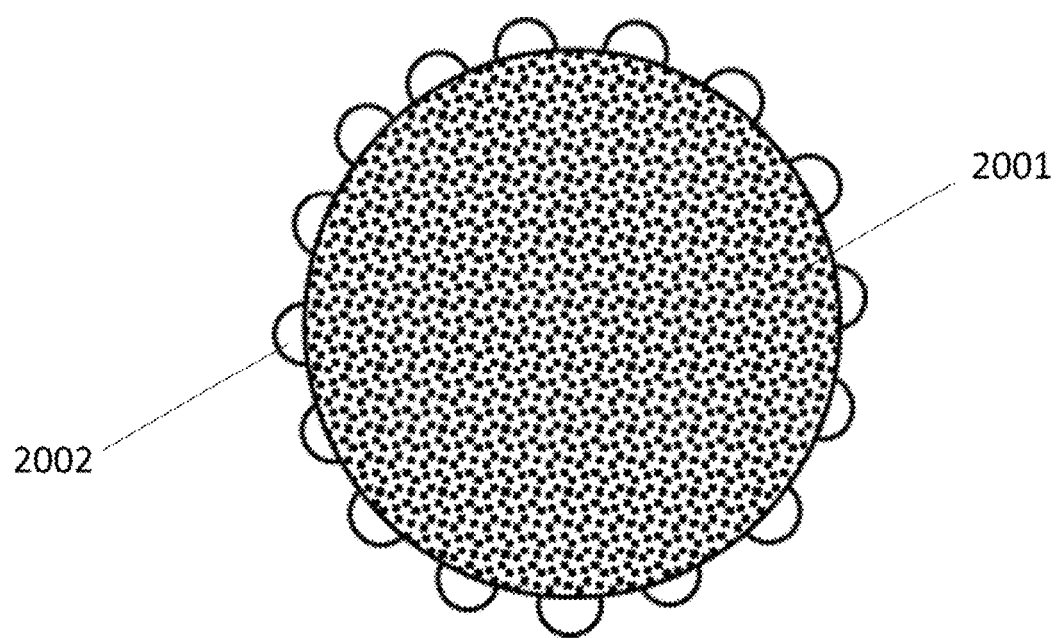
FIG. 2 shows a cross-section of an HSA support that has metal oxide nanoparticles disposed on the surface.

Several embodiments are disclosed that create reservoirs for peroxide species in proximity to metal oxides that support the Fenton reaction. In one embodiment, an HSA 1001 support has metal oxide nanoparticles 1002 disposed on its external surface as shown in FIG. 1. A cross sectional view (FIG. 2) shows the center of the HSA support 2001 with the metal oxide nanoparticles 2002 disposed around the external surface. In this way, a reservoir is created in the interior of HSA support that is in communication with, but mostly separated from the metal nanoparticles. The metal oxide nanoparticles may be iron oxide (ferrous or ferric oxide) or copper oxide (cuprous or cupric oxide) and may be in a size ranging from 1-100 nm, more preferably 1-50 nm, and most preferably 1-20 nm. The HSA supports are metal oxide or mixed metal oxide porous materials, 0.8-150 microns in the longest dimension which have $N_2$ BET surface area in the range of 50-600 $m^2/g$, mesopore size in the range of 2-50 nm, and with pore volume in the 0.2-1.5 cc/g range. HSAs can include alumina, zirconia, titania, silica alumina, aluminasilicate, silica, and zeolites. Preferably the mesopore size range is 4-40 nm.

It is an objective of the invention to disperse the metal oxide nanoparticles on the external surface of the HSA material while the internal structure remains substantially free of the metal oxide nanoparticles. These structures are referred to here as core-shell structures. Substantially free means <10% on average across the interior volume of the HSA support, preferably <1%, more preferably <0.1% and most preferably 0.01%. The center region, defined as the center 75% of the volume should have <0.1% metal.

Metal oxide nanoparticles can be synthesized from colloidal preparations and applied to the surface of the particles to achieve the desired structures. These surfactant-capped nanocrystals can be dissolved in solvents including water, ethanol, propanol, isopropanol, butanol, toluene, and hexane and applied to the external surface of the HSA. Ferric oxide, ferrous oxide, cupric oxide, cuprous oxide, and the like may be prepared following a variety of wet chemical and solvothermal approaches. By varying reaction conditions including metal precursors, temperature, reaction time, solvents, and ligands, a variety of shapes (spheres, rods, bipyramids, etc.), crystalline phases, sizes, and solubilities can be achieved. Soluble, metal oxide nanoparticles are attained by incorporating ligands that can coordinate to the surface of the nanocrystals during growth. These ligands prevent particles from aggregating, passivate surface defects, and allow for nanocrystal solubility in a variety of solvents. Ligands may be selected to facilitate the incorporation of the metal oxide nanoparticles onto the external surface of the HSA and may include such materials as alkyl carboxylic acids, alkyl phosphonic acids, and alkyl alcohols. A high-temperature calcination step may be used to remove the surface organics.

In another embodiment, metal oxide precursors can be applied to the external surface of the HSA and treated thermally, chemically with, e.g., ammonium hydroxide, sodium hydroxide, sodium carbonate, and the like, or combination of thermal and chemical processes, using, e.g., metal sols, to achieve the desired metal oxide particles. Metal precursors can be restricted to the external surface of the HSA by employing size exclusion principles, in which the precursor is too large to fit into the pores, drying temperatures and drying ramps to rapidly force deposition to the external surface of the HSA, multi-solvent routes to prevent impregnation of the precursors in the interior of the HSA, or combinations thereof. Examples of metal precursors include chlorides, nitrates, sulfates, gluconates, citrates, acetates, acetylacetonates, methoxides, and ethoxides of Fe(II), Fe(III), Cu(I), and Cu(II). Oligomeric and polymeric ligands precursors of Fe(II), Fe(III), Cu(I), and Cu (II), including polyphenolates, Suitable solvents for synthesis include water, methanol, ethanol, propanol, isopropanol, hexane, and toluene.

Figure 3:
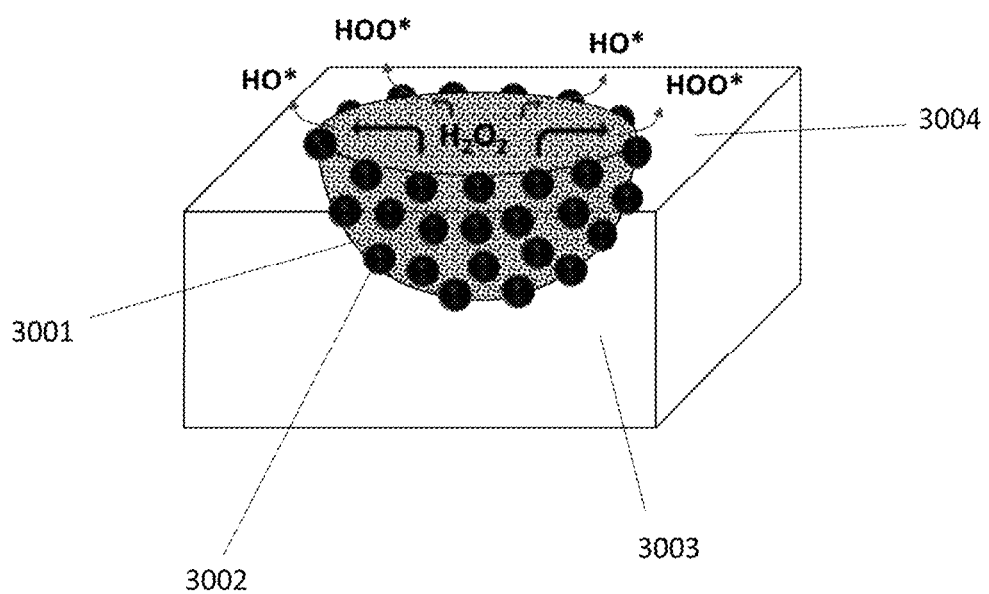
FIG. 3 shows an HSA support that has metal oxide nanoparticles disposed on the surface embedded in a matrix with a cross-sectional portion of the HSA exposed.

To create the desired surface, the metal oxide 3001 decorated HSA supports 3002 are incorporated into a matrix 3003 (FIG. 3). In order to expose the interior, a portion of the HSA support may be removed, for example by lightly abrading the surface such that the cross section of the decorated HSA support is exposed at the surface of the matrix containing the support. In practice, a plurality of decorated HSA supports are incorporated into the matrix. The loading of support to matrix may be in the range of 0.1-50%, preferably 0.1-20%, and more preferably 0.1-10% by volume. In use, the HSA support can sorb peroxide species, e.g., $H_2O_2$ from a peroxide-based disinfecting liquid. The peroxide can then desorb out of the support to the ambient. A portion of the peroxide will contact the metal oxide nanoparticles and create ROS through the Fenton reaction.

Figure 4:
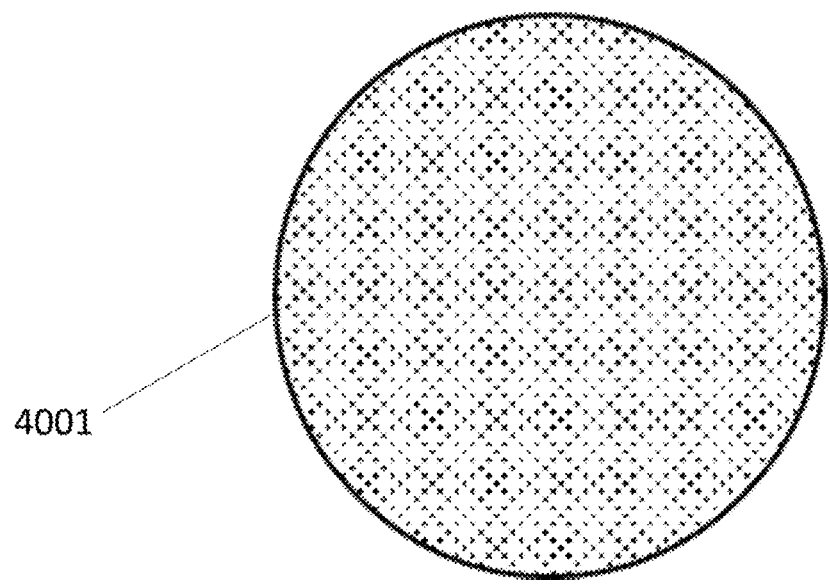
FIG. 4 shows an HSA support that has a MOF disposed on the surface.
Figure 5:
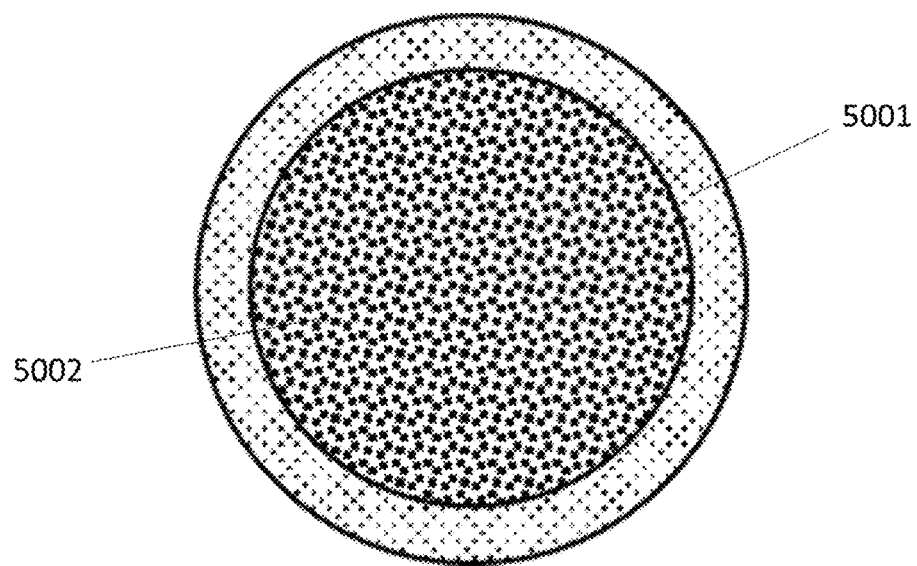
FIG. 5 shows a cross-section of an HSA support that has a MOF disposed on the surface.
Figure 6:
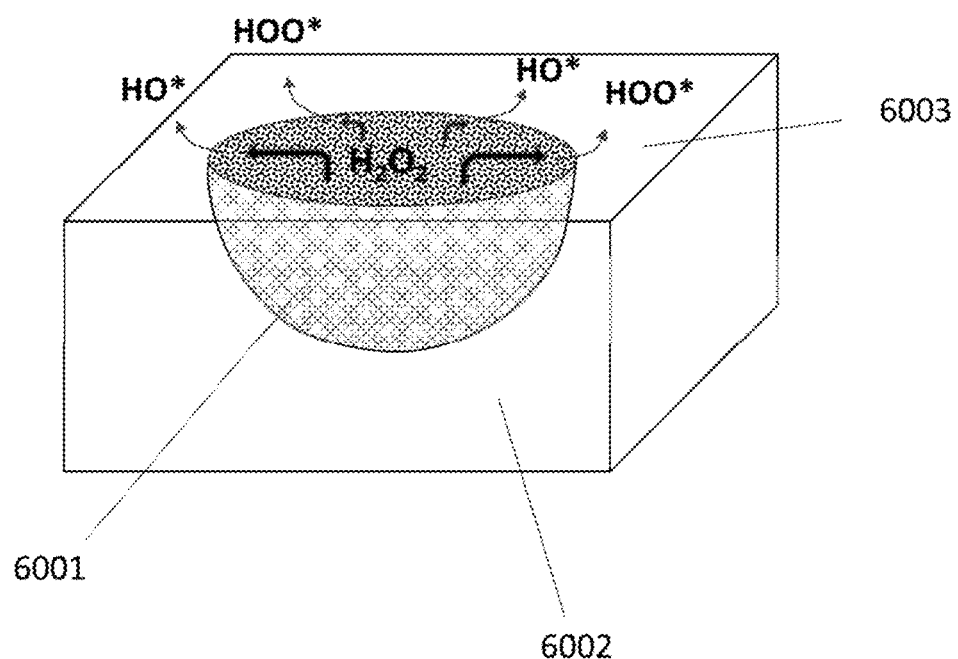
FIG. 6 shows a cross-section of an HSA support that has a MOF disposed on the surface embedded in a matrix with a cross-sectional portion of the HSA exposed.
Figure 7:
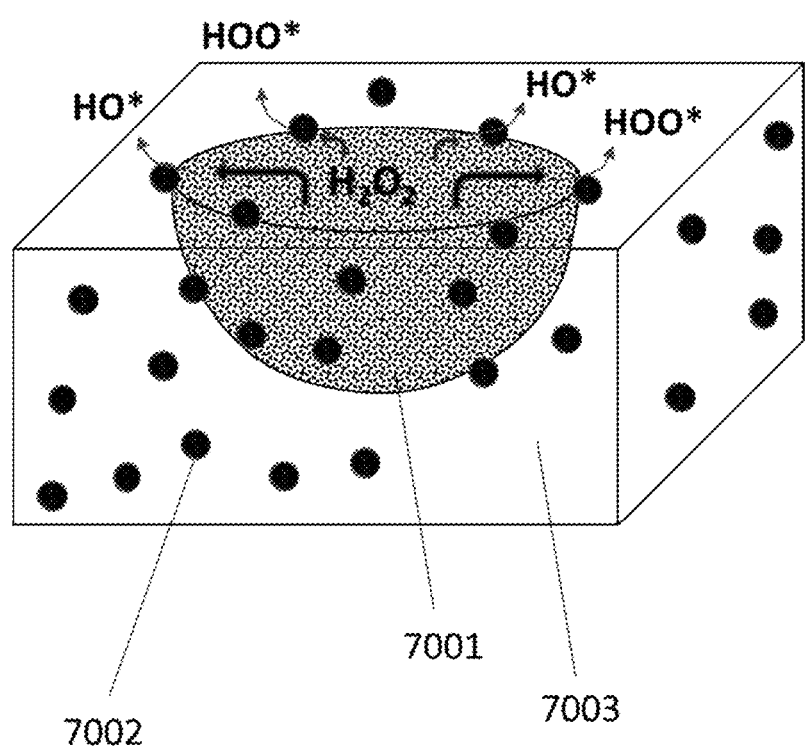
FIG. 7 shows an HSA support together with separate metal oxide nanoparticles embedded in a matrix with a cross-sectional portion of the HSA exposed.

In another embodiment, an HSA support may be coated with a metal organic framework (MOF) 4001 as shown in FIG. 4. A cross sectional view in FIG. 5 shows that the MOF 5001 is disposed at the surface of the HSA support 5002. The metal in the MOF is iron or copper. Examples of suitable MOFs include MOF-5. The HSA support has the characteristics described in the first embodiment. The surface is created by incorporating the MOF coated HSA 6001 support into a matrix 6002, where a portion of the cross section of the MOF coated support is exposed at the surface of the matrix 6003 as shown in FIG. 6. In order to expose the interior, a portion of the HSA support may be removed, for example by lightly abrading the surface such that the cross section of the decorated HSA support is exposed at the surface of the matrix containing the support. In practice, a plurality of decorated HSA supports are incorporated into the matrix. The loading of support to matrix may be in the range of 0.1-50%, preferably 0.1-20%, and more preferably 0.1-10% by volume. In use, the HSA support can sorb peroxide species, e.g., $H_2O_2$ from a peroxide based disinfecting liquid. The peroxide can then desorb from the support to the ambient. A portion of the peroxide will contact the MOF and create ROS through the Fenton reaction.

In another embodiment, an HSA support 7001 may be incorporated into a matrix 7002 that contains metal oxide nanoparticles 7003 dispersed throughout it. The metal oxide nanoparticles may be iron oxide (ferrous or ferric oxide) or copper oxide (cuprous or cupric oxide) and may be in a size ranging from 1-100 nm, more preferably 1-50 nm, and most preferably 1-20 nm. The loading of metal oxide nanoparticles to matrix may be in the range of 0.1-50%, preferably 0.1-20%, and more preferably 0.1-10% by volume. The HSA supports have the characteristics described in the first embodiment. Optionally, a portion of the HSA support may be removed, for example by lightly abrading the surface such that the cross section of the HSA support is exposed at the surface of the matrix containing the support. In practice, a plurality of HSA supports are incorporated into the matrix. The loading of support to matrix may be in the range of 0.1-50%, preferably 0.1-20%, and more preferably 0.1-10%. In use, the HSA support can sorb peroxide species, e.g., $H_2O_2$ from a peroxide based disinfecting liquid. The peroxide can then desorb from the support to the ambient. A portion of the peroxide will contact the metal oxide nanoparticles and create ROS through the Fenton reaction.

Figure 8:
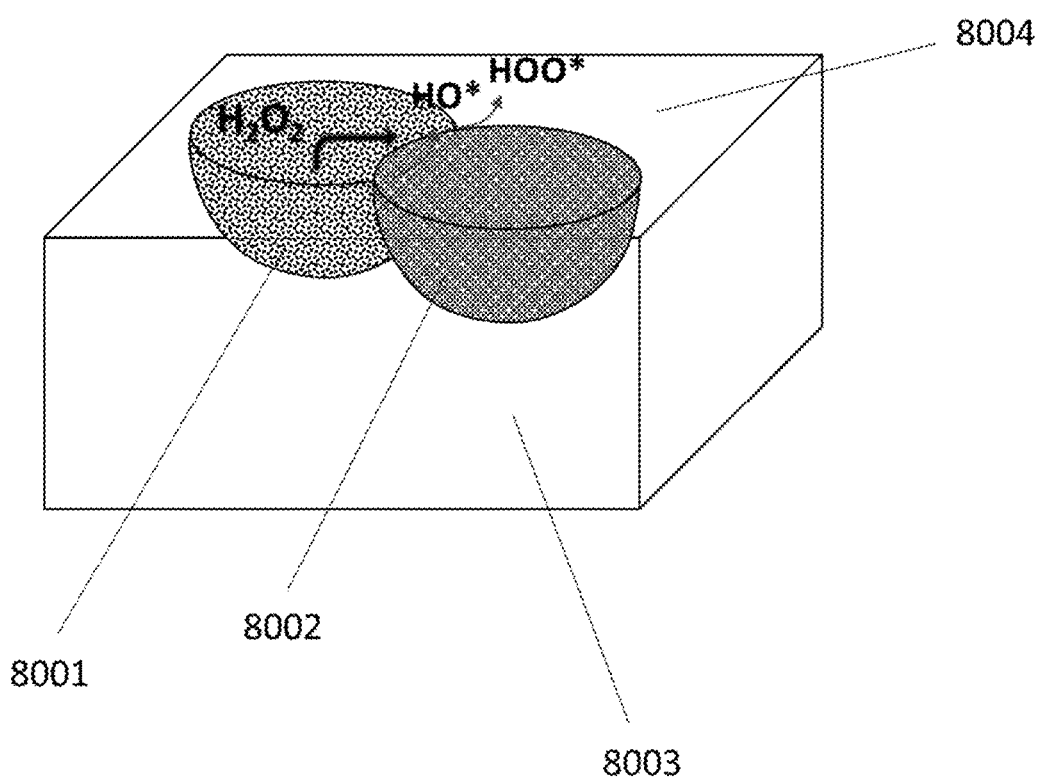
FIG. 8 shows an HSA support together with another HSA support loaded with metal oxide nanoparticles embedded in a matrix with a cross-sectional portion of the HSA exposed.

In another embodiment, heterogenous HSAs can be used. For example, one HSA is unmodified. A second HSA is modified throughout with iron or copper oxide nanoparticles. These two types of HSA are then brought into intimate contact through agglomeration or aggregation. The agglomerates may be re-sized to the desired dimensions. A schematic of such an agglomerate is shown in FIG. 8. The unmodified HSA 8001 and the metal modified HSA 8002 can be incorporated into a matrix 8003. Optionally, a portion of the HSA support may be removed, for example by lightly abrading the surface such that the cross section of the HSA support is exposed at the surface of the matrix 8004 containing the support. In practice, a plurality of HSA supports are incorporated into the matrix. The loading of heterogeneous support to matrix may be in the range of 0.1-50%, preferably 0.1-20%, and more preferably 0.1-10%. In use, the HSA support can sorb peroxide species, e.g., $H_2O_2$ from a peroxide based disinfecting liquid. The peroxide can then desorb from the unmodified support to the ambient. A portion of the peroxide will contact the metal oxide nanoparticles of the modified support and create ROS through the Fenton reaction.

In another embodiment, HSA supports may be used alone as reservoirs to sorb and desorb cleaning agents, including hydrogen peroxide, bleach, and peracetic acid, to extend disinfection between cleanings. A plurality of supports are distributed within the polymer matrix. The loading of HSA supports to matrix may be in the range of 0.1-50%, preferably 0.1-20%, and more preferably 0.1-10%.

In another embodiment (Mode 1), HSA can be modified using quaternary ammonium compounds (QAC), and most preferably quaternary ammonium silanes (QAS). The HSA has the same properties described in the first embodiment. QAS contain alkyl chains, silanes, and positively charged nitrogen and in most cases bind to the surface through the silanes. Cross linkers can be added to the QAS to improve binding to the HSA. QAS loading can be 0.1-50% by weight and more preferably 0.1-25% by weight. In practice a plurality of QAS modified HSAs is incorporated into the matrix. The loading of support to matrix may be in the range of 0.1-50%, preferably 0.1-20%, and more preferably 0.1-10%.

In another embodiment (Mode 2), HSAs can be decorated with photocatalyst that can be activated with visible light as described in "Monolithic Composite Photocatalysts," U.S. patent application Ser. No. 16/680,495, which is incorporated herein by reference. The monolithic composite photocatalysts are antimicrobial when illuminated through the generation of ROS. The HSAs in these monolithic composite photocatalysts can also serve as reservoirs to sorb cleaning solutions and desorb them to the surface over time. This process can extend the antimicrobial action of the cleaning products in-between cleaning events.

In another embodiment (Mode 3), any of the forgoing embodiments may be combined with monolithic composite photocatalysts described in "Monolithic Composite Photocatalysts," U.S. patent application Ser. No. 16/680,495, which is incorporated herein by reference. The loading of HSA support/monolithic composite photocatalyst to matrix may be in the range of 0.1-50%, preferably 0.1-20%, and more preferably 0.1-10%.

In all of the foregoing examples, the particle size of the HSA, modified or unmodified, and/or monolithic composite photocatalyst may be in the range of 0.5-150 microns, preferably 1-50 microns, and most preferably 1-25 microns.

The visible-light-activated antimicrobial properties of monolithic composite photocatalysts can be enhanced by doping with transition metals, lanthanides, anions, inorganic sensitizers (semiconductors), or noble metals, as described in U.S. patent application Ser. No. 16/680,495.

Another approach for improving the visible-light response of monolithic composite photocatalysts is through the use of hydrogen peroxide or organic dyes as visible-light sensitizers. In this context such sensitizers will be broadly described as photocatalytic enhancing species. The hydrogen peroxide or dye coordinates to the metal center on the photocatalyst, resulting in a complex that absorbs visible light. When coordinated to the metal center, the charges, typically electrons in this process, are injected into the photocatalyst, initiating ROS formation. Optionally, these sensitizers contain functional groups that coordinate strongly to the metal center, including moieties such as OH, COOH, $SO_3H$, and $PO_3H_2$. Hydrogen peroxide is one of the simplest sensitizers. To enhance performance under roomlight illumination, the photocatalytic response of the metal-hydrogen peroxide adduct should be greater when activated with visible light than when the unmodified photocatalyst is activated with the same light. Dyes such as eosin Y and methylene blue yield comparable results, with mineralization rates specific to the system of interest.

Periodic dosing of the surface coating with the sensitizer either in a cleaning product or in a separate solution can be used to maintain an active layer of the photocatalyst-sensitizer adduct on the surface of the coating in-between cleaning events.

In one example, hydrogen peroxide in cleaning products applied to the surface of the coating coordinates to the photocatalytic metal center to provide enhanced antimicrobial activity under visible light. During each application of the cleaning product, the metal-peroxide adduct can be replenished or it can be added at different intervals. Dyes can also be periodically applied in this way, either in solution with cleaning products or applied as a separate, activating, wipe-down step. Suitable dyes include Alizarin Red, Eosin-Y, Rhodamine B, Sulforhodamine-B, Squarylium Cyanine (SQ), Ethyl Orange (EO), Acid Orange 7 (AO), Rose Bengal, Cyanine dyes, Cresyl violet, Hemicyanine dyes, Riboflavin, Merocyanine dyes, Coumarin dyes, Methylene Blue, Methyl orange, Methyl red, and Indigo carmine.

In another aspect, the invention relates to the use of HSA supports in particulate form to store and release disinfecting agents in which the HSA supports are contained in the surface or in the coating and proximate to the outer surface of the coating or object that comes in contact with the environment and is subject to being touched. The HSA supports may have particle like geometries with diameters between 10 nm and 70 microns, more preferably 1-10 microns and may be loaded into a coating at 0.1 to 40 wt % or incorporated into a surface at a ratio of 0.1-40% by area at the outer surface of the surface or object. The HSA supports act as reservoirs that sorb disinfecting liquids, mists or vapors and then desorb them over time to provide antimicrobial activity. Disinfecting liquid include hydrogen peroxide or solutions that contain hydrogen peroxide, bleach, or solutions that contain bleach, peracetic acid, or solutions that contain peracetic acid.

In another aspect the invention relates to a method of contacting a surface or coating that contains HSA supports with disinfecting agents in liquid, mist, or vapor form, including hydrogen peroxide or solutions that contain hydrogen peroxide, bleach, or solutions that contain bleach, peracetic acid, or solutions that contain peracetic acid. The surface than has antimicrobial properties for a period of time that may range from minutes to hours.

Turning now to the matrix of the surface or coating, it comprises a polymer, which may be an organic or an inorganic polymer. Suitable organic polymers include polyurethane, polyimides, polyesters, acrylics, polycarbonates, polypropylenes, polyetheretherketone, fluoropolymers, epoxies, and epoxy reinforced polyesters. Inorganic polymers include silicone or various siloxanes. The surface may be a monolithic form or it may be in the form of a coating.

For a monolithic form, the constituents of the HSA support, attached metal oxide nanoparticles, monolithic composite photocatalysts, distributed metal oxide nanoparticles or combinations thereof as described above may be distributed throughout a polymer matrix or confined to a surface region of the object. Examples of monolithic forms include fibers that may be woven or non-woven, and solid forms including switch levers, handles, actuator buttons, and the like. The various constituents may be mixed with a polymer material and injection molded, or may be co-extruded in an apparatus that distributes the constituents onto the surface of the extruded part, which may be an outer or interior surface, e.g., of a tube. A tube with the constituents present on the outer surface may be used for a protective sleeve for a handle on a shopping cart or grab bar, for example. The constituents of the HSA support may also be incorporated into a polymer laminate on a substrate, e.g., melamine, during the fabrication process by impressing the particles into the melamine surface or mixing them with the melamine prior to its application to the substrate.

The antimicrobial surface may also be the surface of a part produced by additive manufacturing. Additive manufacturing, also referred to as 3-D manufacturing or 3-D printing is process in which a shape is built up layer by layer in the desired geometrical shape using a polymeric material that is dispensed in a semi-solid state. In the present invention, any of the particles or HSA materials or supports or their various embodiments with catalysts or photocatalysts may be incorporated into the semi-solid material prior to dispensing. The mixture of the particles or HSA materials or supports may be dispensed throughout the process to form a solid form where they are disposed throughout, or they may be intentionally dispensed proximate to the outer surface of the part as desired.

Coatings of the subject materials may be applied by various means. A preferred method is dry powder coating. This method imparts a charge to the particles, which may include various combinations selected from the HSAs, monolithic composite photocatalysts, the polymers, and other additives commonly found in commercial powder coat formulations. A conductive, grounded surface attracts the charged particles to build up a layer of coating. The coating is then cured, which may be carried out by a thermal process, e.g., a heat treatment at temperatures in the range of 100-250° C. for several minutes. The curing process may also be carried out by ultraviolet light.

Coatings of the subject materials may also be in aqueous or solvent borne paints or polymers. Paints may include polyurethane formulations, acrylics, and polyvinyl alcohols. The paint or powder coating may also include other constituents, including cross linking agents, opacity agents (e.g., barium sulfate), pigments, surfactants and the like.

The aforementioned abrasion may be carried out with a fixed abrasive on a pad or the like, or may be carried out with non-fixed abrasive, e.g., grit blasting or polishing. Coated parts may also be abraded in vibratory shakers with various abrasive media such as small stones, etc.

Optionally, additional layers may be added to the modified HSA supports to serve as spacers between the matrix and the active region that generates the ROS. These layers may be silicon containing moieties or various oxides, including alumina, silica, and mixtures thereof as described in Photocatalytic Surface Systems, U.S. patent application Ser. No. 16/278,092, which is incorporated by reference herein. Any of the methods described therein to create additional layers on the monolithic composite photocatalyst may be used to create similar layers or "shells" on the modified or unmodified HSA supports described herein.

The photoactive component of the subject innovation, the monolithic composite photocatalyst ("photocatalyst"), may be also advantageously incorporated in a range of flexible or soft matrices in order to provide unique and useful properties to those matrix-photocatalyst hybrid materials. The surface chemistry and related generation of ROS discussed above, related to hard surface coatings, is applicable to such flexible materials as well.

Antimicrobial effects, including bactericidal, virucidal and sporicidal effects, are of particular interest for disinfecting a range of medical and biopharmaceutical manufacturing, in isolation gowns, surgical gowns, surgical drapes and covers, surgical & PPE masks, surgical scrub suits, caps, medical packaging, shoe covers, wipes wound dressings and the like. These products may be continuously disinfected using ambient light, or periodically disinfected using illumination systems (Mode 2). In the absence of adequate illumination these articles may also be disinfected via Mode 1 of the subject invention.

In one embodiment of the invention, the disinfecting liquid described above may be provided to the article using misting systems, or alternatively via dipping in which the pore volume of the active media is loaded with peroxide as described above. Misting systems typically employ an ultrasonic nebulizer to provide an aerosol of the disinfecting liquid.

These soft matrices may include either woven or non-woven materials, preferably fabricated from nylon, polypropylene, fluorinated polymers such as PTFE or other polymers that possess desirable properties for an intended application. Non-woven fabrics, may be made by manufacturing techniques including melt blowing, spun laying, stapling, air laying or wet laying. The HSA particles are incorporated into the fibers during these manufacturing processes as an admixture.

The porosity of these flexible soft materials allows flow of gas into them and through them. Those characteristics also allow use of these flexible photocatalyst loaded membranes for photocatalytic purification of air or other fluids. Such air purification may entail either mitigation of gaseous compounds such as VOCs, collection and deactivation of contagion such as aerosolized viruses, or combinations thereof. Air purification systems, regardless of whether the target species are aerosolized or airborne contagion, or VOCs or ethylene, may employ Either Mode 1 or Mode 2, or a combination Mode 3.

Example 1

A polymer coating employs the subject innovations of Mode 1 for self-disinfection of the surface. Mode 1 is enabled by the presence of a core-shell structure comprising alumina HSA supports (10-45 wt %) with a 5-10 wt % loading of copper (II) oxide shell in a powder-coated polyester matrix (25-100 micron thick). The coating is activated by application of clinical disinfecting liquids to generate ROS on the surface. The generated ROS rapidly kill microbes on the surface.

The antiviral capabilities of said coatings containing alumina-copper (II) oxide core-shell catalysts were tested using MS2 bacteriophage as a model organism. A polyester coating without copper (II) oxide catalysts was used as a control. Coatings were soaked in 3% hydrogen peroxide solution for 5 minutes, wiped dry, and air-dried for 15 mins. Approximately $1\times10^4$ plaque forming units (PFUs)/mL of MS2 bacteriophage was then applied to the surface. Surfaces were incubated for 1 hour in ambient conditions. Surviving MS2 bacteriophage was swabbed from the surface using a cotton swab; the cotton swab was sonicated to suspend all removed MS2 bacteriophage particles. The suspended solution was applied to *E. coli* plated as a lawn on agar plates to enumerate the surviving MS2 bacteriophage. Table 1 displays the surviving amount of MS2 bacteriophage on each surface.

TABLE 1

| Surviving phage on high-touch surface coating | |
|---|---|
| High-touch surface coating | Surviving phage on surface |
| Polyester | >500 PFUs |
| Polyester + Copper core/shell catalyst | 30 ± 17 PFUs |

Example 2

A polymer coating employs the subject innovations of Mode 1 for self-disinfection of the surface. Mode 1 is enabled by the presence of alumina HSA supports (10-45 wt %) and copper (I) oxide nanoparticles (1-20 micron, 20-40 wt %) in a powder-coated polyester matrix (25-100 micron thick). The coating is activated by application of clinical disinfecting liquids to generate ROS on the surface. The generated ROS rapidly kill microbes on the surface.

The antiviral capabilities of said coatings containing HSA supports and copper (I) oxide nanoparticles were tested using MS2 bacteriophage as a model organism. A polyester coating containing no HSA supports or copper (I) oxide nanoparticles was used as a control. Coatings were soaked in 3% hydrogen peroxide solution for 5 minutes, wiped dry, and air-dried for 15 mins. Approximately $1\times10^4$ plaque forming units (PFUs)/mL of MS2 bacteriophage was then applied to the surface. Surfaces were incubated for 1 hour in ambient conditions. Surviving MS2 bacteriophage was swabbed from the surface using a cotton swab; the cotton swab was sonicated to suspend all removed MS2 bacteriophage particles. The suspended solution was applied to *E. coli* plated as a lawn on agar plates to enumerate the surviving MS2 bacteriophage. Table 2 displays the surviving amount of MS2 bacteriophage on each surface.

TABLE 2

| Surviving phage on high-touch surface coating | |
|---|---|
| High-touch surface coating | Surviving phage on surface |
| Polyester | >500 PFUs |
| Polyester + HSA supports + Copper (I) oxide nanoparticles | 6 PFUs |

Example 3

A polymer coating employs the subject innovations of Mode 1 for self-disinfection of the surface. Mode 1 is enabled by the presence of core-shell structures comprising alumina HSA supports (10-45 wt %) with a 5-10 wt % loading of copper (II) oxide shell and also the presence of copper (I) oxide nanoparticles (1-20 micron, 20-40 wt %) in a powder-coated polyester matrix (25-100 micron thick). The coating is activated by application of clinical disinfecting liquids to generate ROS on the surface. The generated ROS rapidly kill microbes on the surface.

The antiviral capabilities of said coatings containing alumina-copper (II) oxide core-shell catalysts and copper (I) oxide nanoparticles were tested using MS2 bacteriophage as a model organism. A polyester coating containing no copper oxide catalysts was used as a control. Coatings were soaked in 3% hydrogen peroxide solution for 5 minutes, wiped dry, and air-dried for 15 mins. Approximately $1\times10^4$ plaque forming units (PFUs)/mL of MS2 bacteriophage was then applied to the surface. Surfaces were incubated for 2 hours in ambient conditions. Surviving MS2 bacteriophage was swabbed from the surface using a cotton swab; the cotton swab was sonicated to suspend all removed MS2 bacteriophage particles. The suspended solution was applied to *E. coli* plated as a lawn on agar plates to enumerate the surviving MS2 bacteriophage. Table 3 displays the surviving amount of MS2 bacteriophage on each surface.

TABLE 3

| Surviving phage on high-touch surface coating | |
|---|---|
| High-touch surface coating | Surviving phage on surface |
| Polyester | >500 PFUs |
| Polyester + Copper core/shell catalyst + Copper | 0.5 > 1 PFUs |

TABLE 3-continued Surviving phage on high-touch surface coating

| High-touch surface coating | Surviving phage on surface |
|---|---|
| oxide nanoparticles | |

Example 4

A polymer surface, such as a thermoplastic, can employ the subject innovation by embedding a plurality of QAS-modified HSA supports into a thermoplastic surface. Embedding is done by taking the thermoplastic to or above the softening temperature and using pressure to force the QAS-modified HSA into the surface. For example, pressure can be applied using a plate or roller. The QAS-modified HSA can be applied during thermoplastic production such as right after extrusion, or post-production to existing products. Alternatively, an unmodified HSA can be incorporated into the thermoplastic surface followed by modification with QAS.

Example 5—Polymer Surface with Quats and Photocatalyst on HSA Supports

A polymer surface, such as a thermoplastic, can employ the subject innovation by embedding a plurality of QAS-modified HSA supports and monolithic composite photocatalyst—(i.e., photocatalyst-modified HSA supports) into a thermoplastic surface. The QAS and photocatalyst can be on the same or separate HSA supports. Embedding is done by taking the thermoplastic to or above the softening temperature and using pressure to force a mixture of QAS- and photocatalyst-modified HSA into the surface. For example, pressure can be applied using a plate or roller. The QAS-modified HSA can be applied during thermoplastic production, such as right after extrusion, or post-production to existing products.

Example 6

Figure 9:
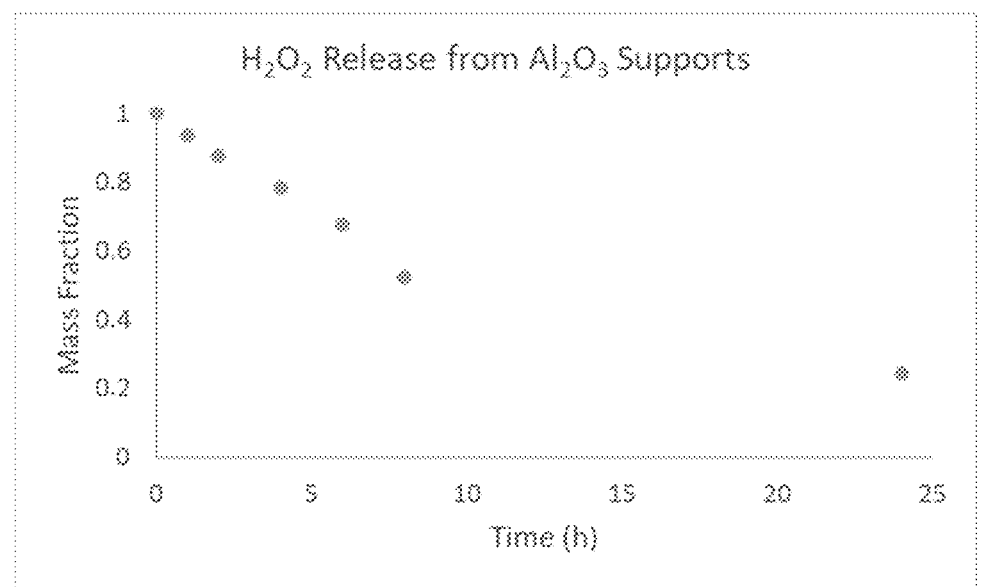
FIG. 9 shows release of hydrogen peroxide from HSA supports as a function of time under ambient conditions.
Figure 10:
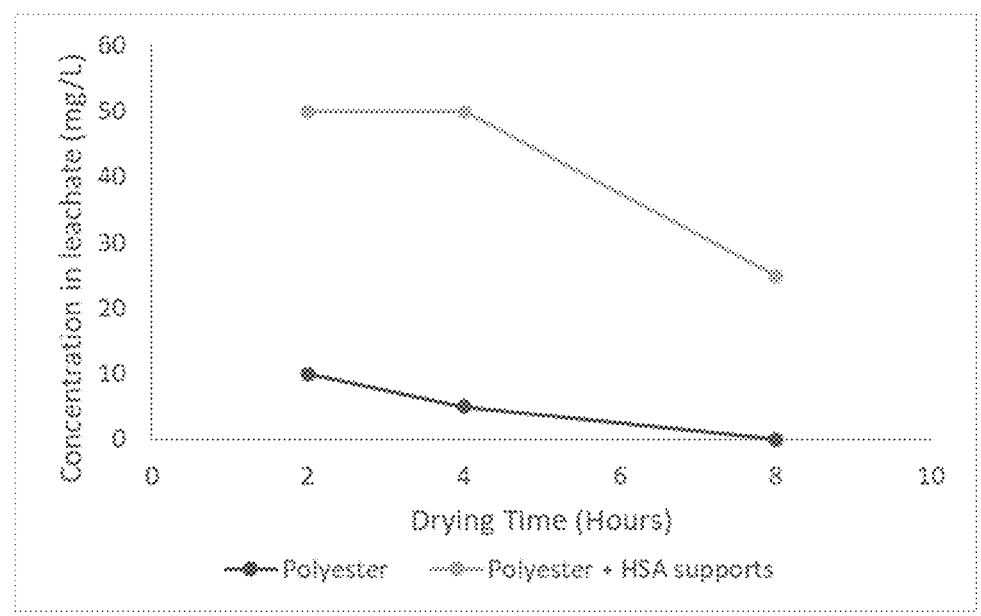
FIG. 10 shows release of hydrogen peroxide from coatings containing HSA supports as a function of time under ambient conditions.

A high-touch surface coating employs the subject innovations with Mode 1 employed for self-disinfection of the surface. Mode 1 is enabled by the extended desorption of hydrogen peroxide from alumina HSA supports in a powder-coated polyester matrix. A 30% solution of hydrogen peroxide in water was added to HSA supports and the mass of loaded supports was measured. Supports were left in ambient conditions to desorb hydrogen peroxide for 24 hours. The mass of supports decreased slowly over time (FIG. 9). Hydrogen peroxide was also sorbed to a polyester coating containing HSA supports by soaking the coatings in 30% hydrogen peroxide solution for 5 minutes. Coatings were wiped dry and left in ambient conditions to release loaded hydrogen peroxide for up to 8 hours. After certain drying times, coatings were placed in 5 mL of water to leach hydrogen peroxide still present in the coatings. Hydrogen peroxide concentration was analyzed by a colorimetric indicator strip. A polyester coating containing no HSA supports was used as a control. The amount of hydrogen peroxide remaining in the coating was calculated at each time point based on the leached concentration (FIG. 10).

Coatings were soaked in 3% hydrogen peroxide solution for 5 minutes, wiped dry, and air-dried for 16 hours. Approximately $1 \times 10^4$ plaque forming units (PFUs)/mL of MS2 bacteriophage were then applied to the surface. Surfaces were incubated for 1 hour in ambient conditions. Surviving MS2 bacteriophage was swabbed from the surface using a cotton swab; the cotton swab was sonicated to suspend all removed MS2 bacteriophage particles. The suspended solution was applied to *E. coli* plated as a lawn on agar plates to enumerate the surviving MS2 bacteriophage. Table 4 displays the surviving amount of MS2 bacteriophage on each surface.

TABLE 4

Surviving phage on high-touch surface coating

| High-touch surface coating | Surviving phage on surface |
|---|---|
| Polyester | 88 PFUs |
| Polyester + HSA supports | 2 PFUs |

Example 7

A polyester film containing 20 wt % silica-alumina HSA supports was deposited onto an aluminum substrate. The coating was mildly abraded with 600 grit SiC. Coatings without the HSA supports were prepared in a similar manner. An accelerated peroxide disinfecting liquid (Oxivir, a product of Diversey Corp.) was applied to the surfaces of the polymer coatings with a wipe and allowed to remain wet for 5 min. The samples were then allowed to dry overnight. The films were then inoculated with $6 \times 10^6$ *Staphylococcus aureus*. A separate set of films were inoculated with $2.06 \times 10^6$ *Pseudomonas aeruginosa*. After 1 hour, the surviving bacteria were removed via swab and transferred to agar plates. The agar plates were incubated for 24 hr @37° C. and then the bacterial colony forming units (CFUs) were enumerated. Results for *S. aureus* are shown in Table 5. The control sample without the HSA supports had 212 CFUs. The sample with HSA supports showed no surviving CFUs. Results for *P. aeruginosa* are shown in Table 6. The control sample without the HSA supports had >1000 CFUs. The sample with HSA supports showed 17 surviving CFUs.

TABLE 5

Surviving *Staphylococcus aureus* on high-touch surface coating

| High-touch surface coating | Surviving phage on surface |
|---|---|
| Polyester | 212 CFUs |
| Polyester + HSA supports | 0 CFUs |

TABLE 6

Surviving *Pseudomonas aeruginosa* on high-touch surface coating

| High-touch surface coating | Surviving phage on surface |
|---|---|
| Polyester | 1000 CFUs |
| Polyester + HSA supports | 17 CFUs |

Example 8

An N95 mask employs the subject innovations with both Mode 1 and Mode 2 employed for high-speed mask sterilization. Mode 2 is enabled by the presence of monolithic composite photocatalyst particles incorporated in an electrostatic non-woven polypropylene mesh filter. The face mask has an exhalation valve that reduces resistance during exhalation but results in a larger load of virions (incident on the mask as an aerosol) present on the surface of the mask after use. During normal use and handling active virions may also reach the interior surface. The invention may be applied to other masks, e.g., N100 and P100.

Mode 1 is enabled by providing a source of Cu ions deposited on the fibrous network that supports the photocatalyst particles. Rapid sterilization is achieved by a system that provides high intensity visible and UVA illumination to the mask, along with a hydrogen peroxide containing mist that is ultrasonically generated. The combined photocatalytic generated ROS (Mode 2) an enhanced ROS (Mode 1) rapidly disable attached virions and kill bacteria on the surface.

The subject invention may be embodied in the following examples that are by no means restrictive, but intended to illustrate the invention. In particular, aspects of the various examples and embodiments may be combined to comprise variations of this invention. It will be clear that the described invention is well adapted to achieve the purposes described above, as well as those inherent within. The citation of any publication is for its disclosure prior to the filing date and should not be construed as an admission that the present invention is not entitled to antedate such publication by virtue of prior invention. Numerous other changes may be made which will readily suggest themselves to those skilled in the art and which are encompassed both in the spirit of the disclosure above and the appended claims.

What is claimed is:

1. An antimicrobial polymer surface, comprising; an antimicrobial polymeric matrix that incorporates a plurality of high surface area supports, the high surface area supports acting as hydrogen peroxide reservoirs and not containing over 10% metal, the high surface area supports being proximate to regions containing a metal based Fenton catalyst, wherein both the high surface area supports and the metal based Fenton catalyst regions are proximate to the outer surface of the antimicrobial polymeric matrix.

2. The antimicrobial polymer surface of claim 1, wherein the catalyst is comprised of copper, iron, manganese or cerium compounds, the metals being substantially contained within the catalyst.

3. The antimicrobial polymer surface of claim 1, wherein the catalyst is disposed on the external surface of the high surface area supports as core-shell structures contained within the antimicrobial polymer matrix and proximate to the outer surface of the antimicrobial polymer surface, the core-shell structures allowing Fenton reactions between hydrogen peroxide and metallic compounds.

4. The antimicrobial polymer surface of claim 1, wherein the catalyst is a metalorganic framework containing copper, iron, manganese or cerium therein that is disposed on the external surface of the high surface area support, the metalorganic framework substantially preventing release of metal ions.

5. The antimicrobial polymer surface of claim 1, wherein the high surface area support has iron or copper disposed thereon and the polymeric surface further comprises particles comprising iron or copper within the polymeric matrix, the particles substantially free from release of metal ions.

6. The antimicrobial polymer surface of claim 1, wherein the antimicrobial polymer surface provides antimicrobial activity against bacteria, antiviral activity against viruses, and sporicidal activity against bacterial spores.

7. The antimicrobial polymer surface of claim 1, wherein the polymeric matrix comprises a first type and a second type of high surface area material, the first type being an unmodified high surface area material and the second being a high surface area material that has a catalyst disposed on the surface of the second high surface area material either as a core-shell structure or within the second high surface area material.

8. The antimicrobial polymer surface of claim 7, wherein the first type and second type of high surface area material are in contact with at least a portion of the other.

9. The antimicrobial polymer surface of claim 7, wherein the polymeric matrix comprising the surface contains a metallic catalyst that is spatially and compositionally distinct from the high surface area supports which contain less than 10% metal.

10. An antimicrobial surface, comprising; a material that incorporates a high surface area supported photocatalyst, the high surface area supported photocatalyst having a photocatalytic enhancing species disposed on the photocatalyst, the photocatalyst being combined with a matrix that incorporates a plurality of high surface area supports, the high surface area supports acting as hydrogen peroxide reservoirs and not containing over 10% metal, the high surface area supports being proximate to regions containing a metal based Fenton catalyst, wherein both the high surface area supports and the metal based Fenton catalyst regions are proximate to the outer surface of the matrix.

11. The antimicrobial surface of claim 10 wherein the photocatalyst is a monolithic composite photocatalyst.

12. The antimicrobial surface of claim 10 wherein the photocatalytic enhancing species is comprised of hydrogen peroxide.

13. The antimicrobial surface of claim 10 wherein the photocatalytic enhancing species is comprised of Methylene Blue.

14. A method of disinfecting a polymer surface comprising; forming high surface area supports within an antimicrobial polymer matrix, the high surface area supports acting as hydrogen peroxide reservoirs and not containing over 10% metal, the high surface area supports being formed proximate to regions containing a metal based Fenton catalyst, both the high surface area supports and the metal based Fenton catalyst regions being formed proximate to the outer surface of the antimicrobial polymer matrix, and contacting the outer surface of the polymer matrix with a disinfectant.

15. The method of claim 14, further disposing a catalyst comprised of copper or iron compounds on outer regions of the high surface area supports.

16. The method of claim 15, further disposing the catalyst on the external surface of the high surface area supports as a core-shell structure.

17. The method of claim 15, further forming the catalyst by disposing a metalorganic framework comprising copper or iron on the surface of the high surface area supports.

18. The method of claim 14, further incorporating a Fenton catalyst in the polymer matrix.

19. The method of claim 14, wherein the polymer matrix contains two types of high surface area support, the first type being an unmodified high surface area support and the second type being a high surface area support that has a Fenton catalyst disposed on the surface of the second high surface area support as a core-shell structure or within the second high surface area support.

20. The method of claim 19, wherein the first and second types of high surface area support are in contact with at least a portion of each other.

21. The method of claim 14, wherein the polymer matrix contains a Fenton catalyst that is spatially or compositionally distinct from the high surface area supports.

22. The method of claim 14, wherein the polymer surface contains high surface area materials with iron or copper disposed thereon and iron or copper containing particles within the polymer matrix.

* * * * *